US008818866B2

(12) United States Patent
Chatani et al.

(10) Patent No.: US 8,818,866 B2
(45) Date of Patent: Aug. 26, 2014

(54) CONTENT DISPLAY PROCESSING APPARATUS AND METHOD OF DISPLAYING ADVERTISEMENT IN CONTENTS

(75) Inventors: Masayuki Chatani, Tokyo (JP); Hideaki Nishino, Tokyo (JP)

(73) Assignee: Sony Computer Entertainment Inc. (JP)

( * ) Notice: Subject to any disclaimer, the term of this patent is extended or adjusted under 35 U.S.C. 154(b) by 575 days.

(21) Appl. No.: 12/441,740

(22) PCT Filed: Jun. 20, 2007

(86) PCT No.: PCT/JP2007/000655
§ 371 (c)(1),
(2), (4) Date: Jun. 30, 2009

(87) PCT Pub. No.: WO2008/035451
PCT Pub. Date: Mar. 27, 2008

(65) Prior Publication Data
US 2009/0307095 A1     Dec. 10, 2009

(30) Foreign Application Priority Data

Sep. 19, 2006  (JP) ................................. 2006-252774

(51) Int. Cl.
*G06Q 30/00*     (2012.01)
(52) U.S. Cl.
USPC ................. 705/14.73; 705/14.4; 705/14.61; 463/1; 463/40; 463/42
(58) Field of Classification Search
CPC ........................ G06Q 30/0272; G06Q 30/0277
USPC .......................................................... 705/14
See application file for complete search history.

(56) References Cited

U.S. PATENT DOCUMENTS 5,506,983 A * 4/1996 Atkinson et al. ............... 707/703
6,442,529 B1 * 8/2002 Krishan et al. ............. 705/14.52
(Continued)

FOREIGN PATENT DOCUMENTS

EP     1236487 A2    9/2002
JP     9-010440 A    1/1997
(Continued)

OTHER PUBLICATIONS

Office Action from Japanese Application No. 2006-252774 mailed Nov. 9, 2010.
(Continued)

*Primary Examiner* — John G Weiss
*Assistant Examiner* — Vincent Cao
(74) *Attorney, Agent, or Firm* — Lerner, David, Littenberg, Krumholz & Mentlik, LLP (57) ABSTRACT

An advertisement inserted in contents of, for example, a game does not serve its purpose after a while. An advertisement-information reception unit (112) receives an advertisement-space definition file (32). The advertisement-space definition file (32) is a file that defines an advertisement space for an advertisement to be inserted when contents are displayed and an advertising agency is assigned to the advertisement space. An assignment changing unit (116) cancels the assignment of an advertising agency, whose license has expired, to the advertisement space even when the advertising agency is assigned to the advertising space in the advertisement-space definition file (32). An advertisement downloading unit (118) downloads advertisement data to be inserted in the advertisement space from the server of the advertising agency validly assigned to the advertisement space. A rendering engine (130) inserts, when displaying the contents on a screen, the downloaded advertisement in the advertisement space and displays accordingly.

5 Claims, 6 Drawing Sheets

(56) References Cited

U.S. PATENT DOCUMENTS

| | | | |
|---|---|---|---|
| 6,643,650 B1* | 11/2003 | Slaughter et al. | 1/1 |
| 2002/0023058 A1* | 2/2002 | Taniguchi et al. | 705/57 |
| 2002/0120666 A1* | 8/2002 | Landsman et al. | 709/200 |
| 2003/0149601 A1* | 8/2003 | Cabral | 705/5 |
| 2003/0217170 A1* | 11/2003 | Nelson et al. | 709/231 |
| 2004/0015608 A1* | 1/2004 | Ellis et al. | 709/246 |
| 2004/0268120 A1* | 12/2004 | Mirtal et al. | 713/156 |
| 2005/0038666 A1* | 2/2005 | Theiste et al. | 705/1 |
| 2005/0060162 A1* | 3/2005 | Mohit et al. | 705/1 |

FOREIGN PATENT DOCUMENTS

| | | |
|---|---|---|
| JP | 09-134371 A | 5/1997 |
| JP | 2000-051519 A | 2/2000 |
| JP | 2001-209699 A | 8/2001 |
| JP | 2002-083219 A | 3/2002 |
| JP | 2002-163141 | 6/2002 |
| JP | 2002-253847 | 9/2002 |

OTHER PUBLICATIONS

Office Action from corresponding Japanese Application No. 2006-252774 dated Jul. 6, 2010.

International Search Report and Preliminary Report on Patentability, PCT/JP2007/000655, dated Jul. 6, 2007.

Office Action from Korean Application No. 10-2009-7007404 dated Dec. 13, 2010.

Office Action from Korean Application No. 10-2009-7007404 dated Aug. 30, 2011.

Supplementary European Search Report, EP 07790181 dated Aug. 24, 2011.

Office Action from Korean Application No. 10-2009-7007404 dated Apr. 30, 2012.

Office Action from European Application No. 07790181.7 dated Sep. 4, 2012.

India Examination Report for Application No. 1041/KOLNP/2009 dated Mar. 11, 2014.

* cited by examiner

| ADVERTISING-AGENCY ID | SERVER URL | CONTRACT TERM | DENY FLAG |
|---|---|---|---|
| A | url1 | 2006/1/1~2008/12/31 | — |
| B | url2 | 2005/2/3~2006/3/1 | NG |
| C | url3 | 2006/4/1~2006/9/10 | — |
| D | url4 | 2004/3/10~2005/3/10 | NG |
| ⋮ | ⋮ | ⋮ | ⋮ |

| BILLBOARD X | |
|---|---|
| ADVERTISEMENT SPACE ID | 0100240 |
| IMAGE FORMAT | JPEG |
| SIZE | (200, 300) |
| ADVERTISEMENT CATEGORY | SPORTS |
| SEX | MALE |
| AGE GROUP | 16~39 |
| AUTOMOBILE BODY Y | |
| ADVERTISEMENT SPACE ID | 0405324 |
| IMAGE FORMAT | JPEG |
| SIZE | (120, 180) |
| ADVERTISEMENT CATEGORY | CAR |
| SEX | MALE |
| AGE GROUP | 18~45 |

⋮

ADVERTISING-AGENCY ASSIGNMENT LIST
{BILLBOARD X:
  ADVERTISING AGENCY D;
  ADVERTISING AGENCY A;
AUTOMOBILE BODY Y:
  ADVERTISING AGENCY B;
BILLBOARD Z:
  ⋮
}

FIG.5

```
ADVERTISING-AGENCY ASSIGNMENT LIST
{BILLBOARD X:
   ADVERTISING AGENCY A;
 AUTOMOBILE BODY Y:
   NULL ;
 BILLBOARD Z:
       .
       .
       .
}
```

FIG.7

CONTENT DISPLAY PROCESSING APPARATUS AND METHOD OF DISPLAYING ADVERTISEMENT IN CONTENTS

CROSS REFERENCE TO RELATED APPLICATIONS

The present application is a national phase entry under 35 U.S.C. §371 of International Application No. PCT/JP2007/000655, filed Jun. 20, 2007, published in Japanese, which claims the benefit of Japanese Patent Application No. 2006-252774, filed Sep. 19, 2006. The entire disclosures of each of the above-identified applications are incorporated by reference herein.

TECHNICAL FIELD

The present invention relates to an apparatus and a method of displaying advertisements in the contents of games, etc.

BACKGROUND ART

There are some game contents provided to a user where advertisements are displayed on the screen during game play. For example, a real advertisement is posted as a texture on a billboard of a race course in a car racing game, and a product advertisement is displayed on a billboard in a virtual space where a character explores.

An advertisement that is inserted in such a game space is usually made by a game soft company, which is the creator of the contents, at the request of an advertiser. It is provided in an optical disk such as a CD or a DVD as texture data of the advertisement along with the program data of a game. When a user starts a game by using a personal computer or a home game terminal after purchasing an optical disk that stores the game contents, the advertisement is displayed on an object such as a billboard in the game space.

A patent document 1 discloses a technique for displaying an advertisement during game play by posting it as a texture, and a patent document 2 discloses a system where advertisement information assigned in advance is inserted when a user starts the downloaded contents, and then where the advertisement information is displayed at a corresponding position while the contents are running.

[Patent document 1] JP 9-10440
[Patent document 2] JP 2002-83219

DISCLOSURE OF INVENTION

Technical Problem

Once an optical disk storing game contents is sold to a user, the advertisement data to be inserted in a game space can no longer be changed. In general, the life cycle of the game contents is different from that of an advertisement. Thus, an old advertisement that is no longer effective may be displayed when a user plays a game.

Also, even when a contract made between a game maker or a game device maker and an advertising agency is over, once the game contents have circulated, the display of the advertisement on a game screen can no longer be cancelled. Thus, the advertisement provided by the advertising agency will still be displayed during game play. As described, it is not easy to reflect the latest contract status or business relationship with an advertising agency in game contents that have circulated to a general user.

In this background, a general purpose of the present invention is to provide a technique for dynamically inserting an advertisement, from an advertising agency under contract, in the contents of a game, etc.

Means for Solving the Problem

A content display processing apparatus according to one embodiment of the present invention comprises: an advertisement-information reception unit operative to receive and store in a memory an advertisement-space definition file, which is a file that defines an advertisement space for an advertisement to be inserted when contents are displayed, where at least one of a plurality of advertising agencies that deliver advertisements to the advertisement space is assigned to the advertisement space; an advertisement downloading unit operative to download, in reference to the advertisement-space definition file stored in the memory, advertisement data to be inserted in the advertisement space from the server of the advertising agency assigned to the advertisement space; and a display processing unit operative to insert, when displaying the contents on a screen, the downloaded advertisement in the corresponding advertisement space in the contents and to display accordingly.

Another embodiment of the present invention relates to a method of displaying an advertisement in contents. The method of displaying an advertisement in contents comprises: receiving both an advertisement-space definition file, which is a file that defines an advertisement space for an advertisement to be inserted when contents are displayed, where at least one of a plurality of advertising agencies that deliver advertisements to the advertisement space is assigned to the advertisement space and a license list that stores the information related to the validity of the license of the advertising agency; canceling, in reference to the license list, the assignment of an advertising agency, whose license has expired, to the advertisement space even when the advertising agency is assigned to the advertising space in the advertisement-space definition file; downloading, in reference to the advertisement-space definition file, advertisement data to be inserted in the advertisement space from the server of the advertising agency validly assigned to the advertisement space; and inserting, when displaying the contents on a screen, the downloaded advertisement in the corresponding advertisement space in the contents and displaying accordingly.

Optional combinations of the aforementioned constituting elements, and implementations of the invention in the form of methods, apparatuses, systems, computer programs, data structures, and recording media may also be practiced as additional modes of the present invention.

Advantageous Effects

According to the present invention, an advertisement, from an advertising agency under contract, can be dynamically inserted into a display screen for displaying contents.

EXPLANATION OF REFERENCE 10 game device
12 hardware
14 operating system
16 advertisement management library
18 application
20 license-management server
22 advertising-agency license list
30 content-management server
32 advertisement-space definition file
40 network
50 advertising-agency server
52 advertisement image
60 advertiser terminal
100 content display processing apparatus
110 advertisement-management processing block
112 advertisement-information reception unit
114 advertisement-information memory unit
116 assignment changing unit
118 advertisement downloading unit
130 rendering engine
132 texture memory unit
134 texture-mapping unit
136 rendering processing unit
138 three-dimensional-object memory unit
140 frame buffer
142 display control unit

BEST MODE FOR CARRYING OUT THE INVENTION

Figure 1:
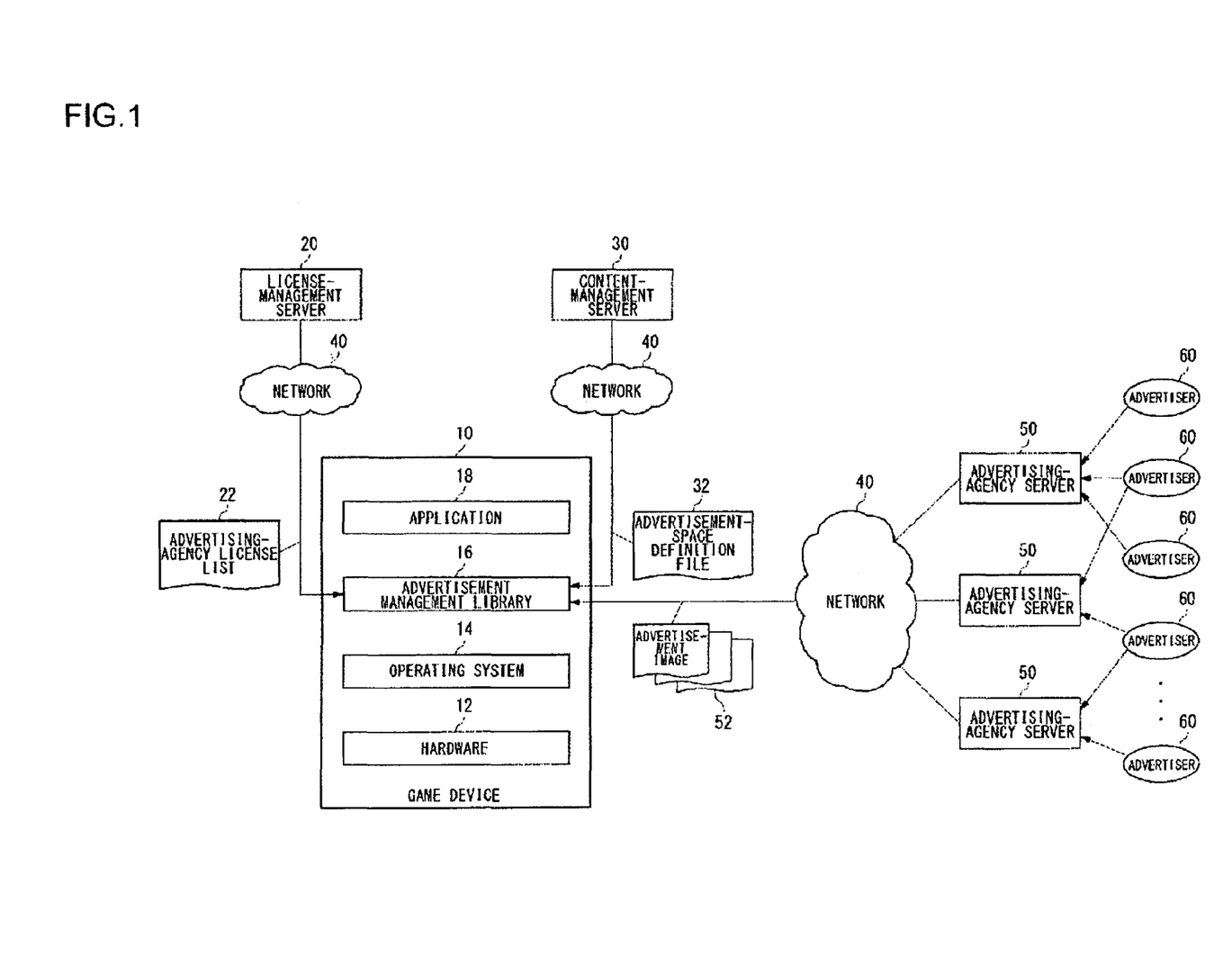
FIG. 1 is a diagram that shows the whole configuration of a content display processing system according to the embodiment.

FIG. 1 is a diagram that shows the whole configuration of a content display processing system according to the embodiment. A game device 10 runs a game program and then displays a game space on a display. A space for advertisement where an advertisement is inserted is provided in the game space, and an advertisement is dynamically inserted and then displayed. The game device 10 is a personal computer or a home game device and is provided with what is called a network connection function, which is represented as a communication function. The game device 10 is connected to a license-management server 20, a content-management server 30, and multiple advertising-agency servers via a network 40.

The license-management server 20 is a server operated by a provider (referred to as a "platform provider") of the game device 10 or of an operating system or a library for a game device, and it manages the licenses granted to advertising agencies by a platform provider, using a database.

The content-management server 30 is a server operated by a content creator or a platform provider, and it manages advertising agencies to be assigned to the spaces for advertisement in a game space with respect to game contents to be run by the game device 10. A content creator can use the consideration obtained by granting an advertising agency an advertisement space for the development of the contents.

An advertising-agency server 50 is a server owned by an advertising agency, and in connection to multiple advertiser terminals 60, it notifies advertisers of the availability of advertisement spaces in game contents and accepts a request for inserting advertisements in the advertisement spaces. The advertising agency receives advertising revenue from the advertisers.

The content-management server 30 provides multiple advertising-agency servers 50 with an advertisement-space definition file 32 that defines an object on which an advertisement can be inserted in the game contents, the size of the advertisement, and the category of the advertisement.

In reference to the advertisement-space definition file 32, an advertising-agency server 50 provides an advertiser with advertisement-guidance information including the category of an advertisement, the size of an advertisement, and an advertising rate through, for example, a dedicated web page of the advertising agency in order to receive a request for an advertisement from the advertiser. Through the advertiser terminal 60, the advertising-agency server 50 can be accessed, the dedicated web page can be browsed for the advertisement-guidance information, and the request for an advertisement can be made on the browser screen.

An advertising agency or an advertisement maker, commissioned to make an advertisement by an advertising agency, generates advertisement data, which includes images and sounds, based on a request from an advertiser. The generated advertisement data is registered in the database of the advertising-agency server 50.

A user runs a game program in the game device 10 either by downloading the game contents to the game device 10 from the content-management server 30 or by purchasing an optical disk that stores the contents. The game device 10 includes: hardware 12 that has a graphics mechanism; an operating system (OS) 14 that both controls the resources of the hardware 12 and provides an execution environment for an application program; an advertisement management library 16 that manages an advertisement to be inserted into contents; and an application 18 that runs while the advertisement management library 16 is in use.

Upon the execution of game contents in the game device 10 by a user, a program module for displaying an advertisement added to the contents is executed along with the execution of a program module of the contents followed by the execution of a game, etc. An advertisement space for an advertisement to be inserted is defined in a game space, and an advertisement may be or may not be assigned to the advertisement space at the time a user purchases the game contents.

The program module for displaying an advertisement is implemented using the advertisement management library 16. The advertisement management library 16 has a function for checking the validity of a license of an advertising agency assigned to an advertisement space and then displaying an advertisement to be assigned to the advertisement space after downloading it from the server of an advertising agency having a valid license. More specifically, the advertisement management library 16 performs the following processes.

The advertisement management library 16 transmits to the content-management server 30 a content ID for the identification of game contents running in the game device 10. The content-management server 30 transmits to the advertisement management library 16 the advertisement-space definition file 32, which defines an advertisement space that is available in the game contents identified by the content ID. In the advertisement-space definition file 32, each advertisement space has an advertising agency that delivers an advertisement to the space assigned to it. The assignment of an advertising agency to an advertising space is determined by a content creator based on the contract made with an advertising agency.

The advertisement management library 16 acquires an advertising-agency license list 22 from the license-management server 20. The advertising-agency license list 22 includes license information of an advertising agency with which a platform provider has a concluded contract. In reference to the advertising-agency license list 22, the advertisement management library 16 cancels the assignment of an advertising agency, whose license has expired, to an advertisement space even when the advertising agency is assigned to any of the advertising spaces in the advertisement-space definition file 32.

The advertisement management library 16 then accesses the server of an advertising agency validly assigned to each advertisement space. The advertising-agency server 50 acquires an advertisement image 52 to be assigned to an advertisement space from a database and then transmits it to the advertisement management library 16 via the network 40. An advertising agency can make a contract for one advertisement space with multiple advertisers, and it can choose an advertiser according to an advertising rate and assign the advertisement of the advertiser to the advertisement space.

In accordance with the progress of the contents of a game, etc., the application 18 acquires from the advertisement management library 16 the advertisement image 52 to be inserted into the advertisement space displayed on the game screen. The advertisement is posted in the advertisement space on the screen and displayed by using the function of texture mapping, etc.

The advertisement management library 16 notifies the ID of an advertisement actually displayed on the game screen to the advertising-agency server 50 of the advertising agency that provided the advertisement. Upon the receipt of the notification from the advertisement management library 16, the advertising-agency server 50 updates and records the number of times the advertisement is displayed. In general, an advertising agency charges an advertiser based on the number of times the advertisement is displayed; however, it may charge based on the actual time spent displaying the advertisement. When the charge based on the number of times an advertisement is displayed reaches a predetermined amount, the advertising-agency server 50 may stop providing the advertisement of the advertiser to the advertisement space and start providing the advertisement of another advertiser to the space.

Figure 2:
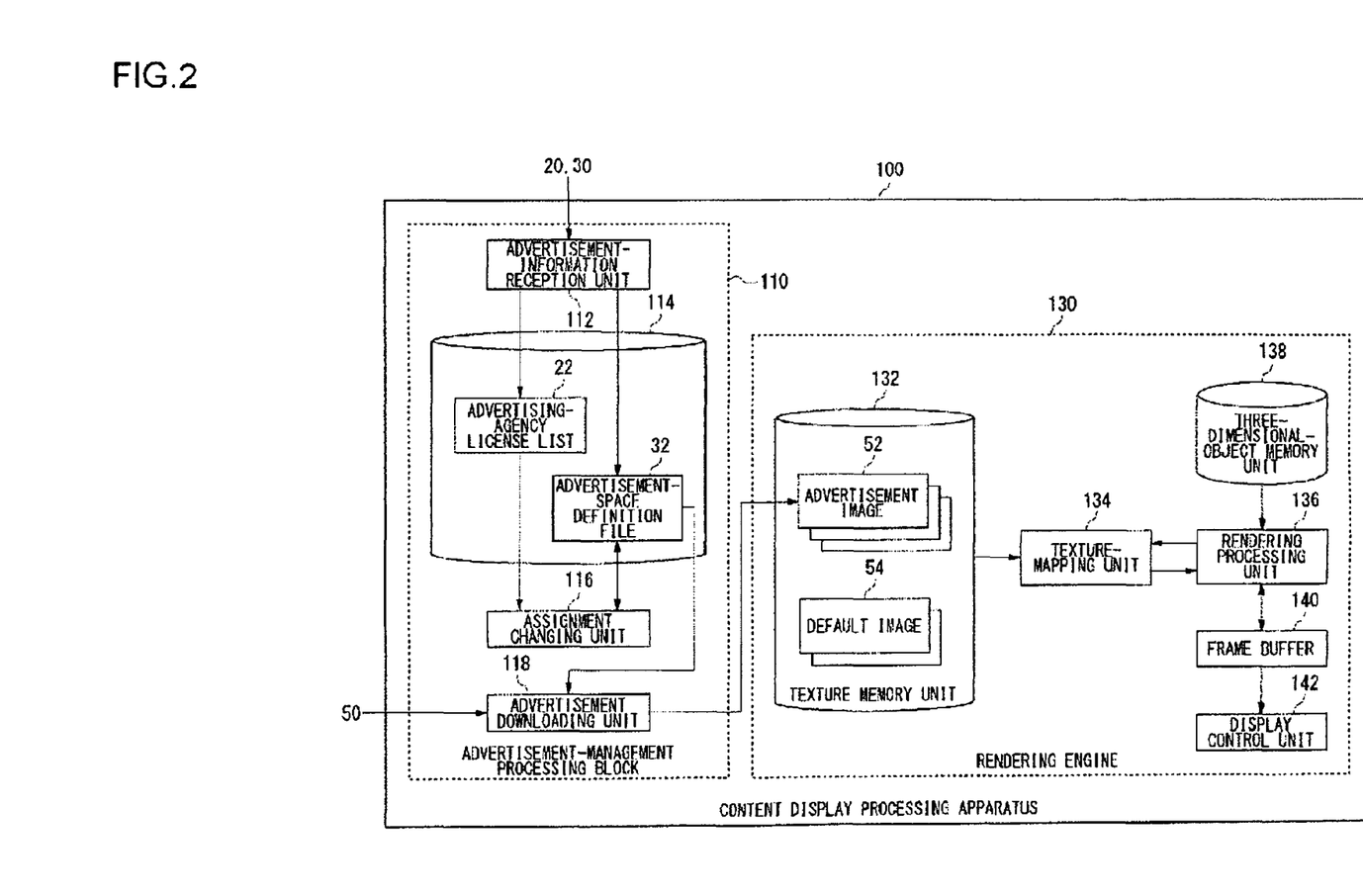
FIG. 2 is a diagram that shows the configuration of a content display processing apparatus according to the embodiment.

FIG. 2 is a diagram that shows the configuration of a content display processing apparatus 100 according to the embodiment. The content display processing apparatus 100 is accomplished by using at least a part of hardware 12 of the game device 10, the operating system 14, and the advertisement management library 16. Thus, functional blocks focusing on functions are shown in the figure, and there are many ways of accomplishing these functional blocks in various forms in accordance with the components of hardware only, software only, or the combination of both.

The content display processing apparatus 100 includes an advertisement-management processing block 110 and a rendering engine 130. The advertisement-management processing block 110 is a function achieved in the advertisement management library 16 of the game device 10, and the rendering engine 130 is a function achieved in either the hardware 12, which has graphics mechanisms such as those performed by a shader, texture mapping, etc., or in the operating system 14, which manages computational resources.

In reference to FIGS. 3-7, a detailed description will be made in the following regarding the configuration and the operation of the content display processing apparatus 100 shown in FIG. 2.

The advertisement-management processing block 110 includes an advertisement-information reception unit 112, an advertisement-information memory unit 114, an assignment changing unit 116, and an advertisement downloading unit 118. The advertisement-information reception unit 112 receives the advertising-agency license list 22 from the license-management server 20 and the advertisement-space definition file 32 from the content-management server 30 and then stores them in the advertisement-information memory unit 114.

Figure 3:
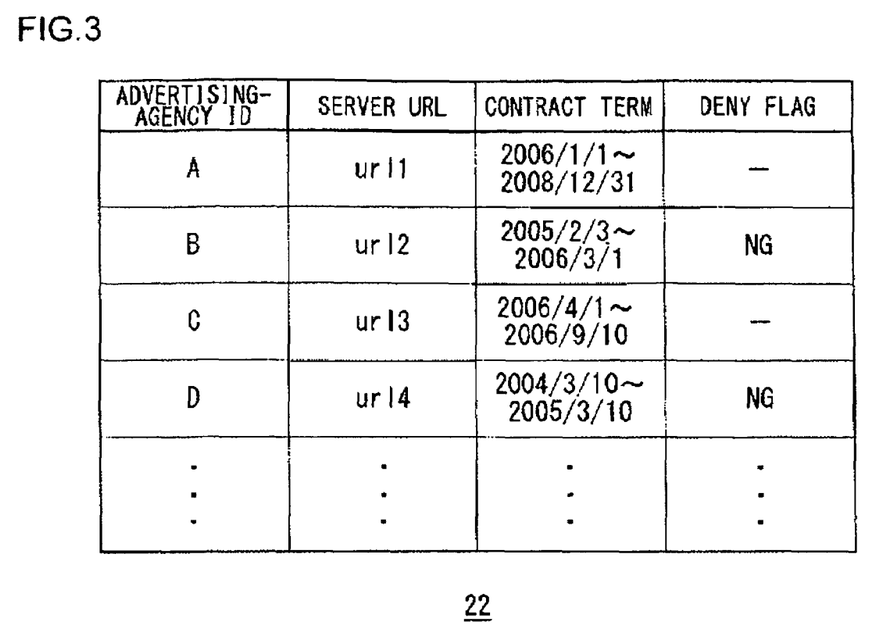
FIG. 3 is a diagram that illustrates the data structure of an advertising-agency license list shown in FIG. 2.

FIG. 3 is a diagram that illustrates the data structure of the advertising-agency license list 22. The advertising-agency license list 22 includes an advertising-agency ID, a URL for an advertising-agency server, a contract term, and a deny flag. The contract term is a validated period for a license granted to an advertising agency by a platform provider. A deny flag is a flag that is set when a platform provider stops accepting the license for an advertising agency, and it can be set even during the contract term. In the example of the figure, no deny flag is set for advertising agencies A and C, and deny flags represented by "NG" are set for advertising agencies B and D.

Figure 4:
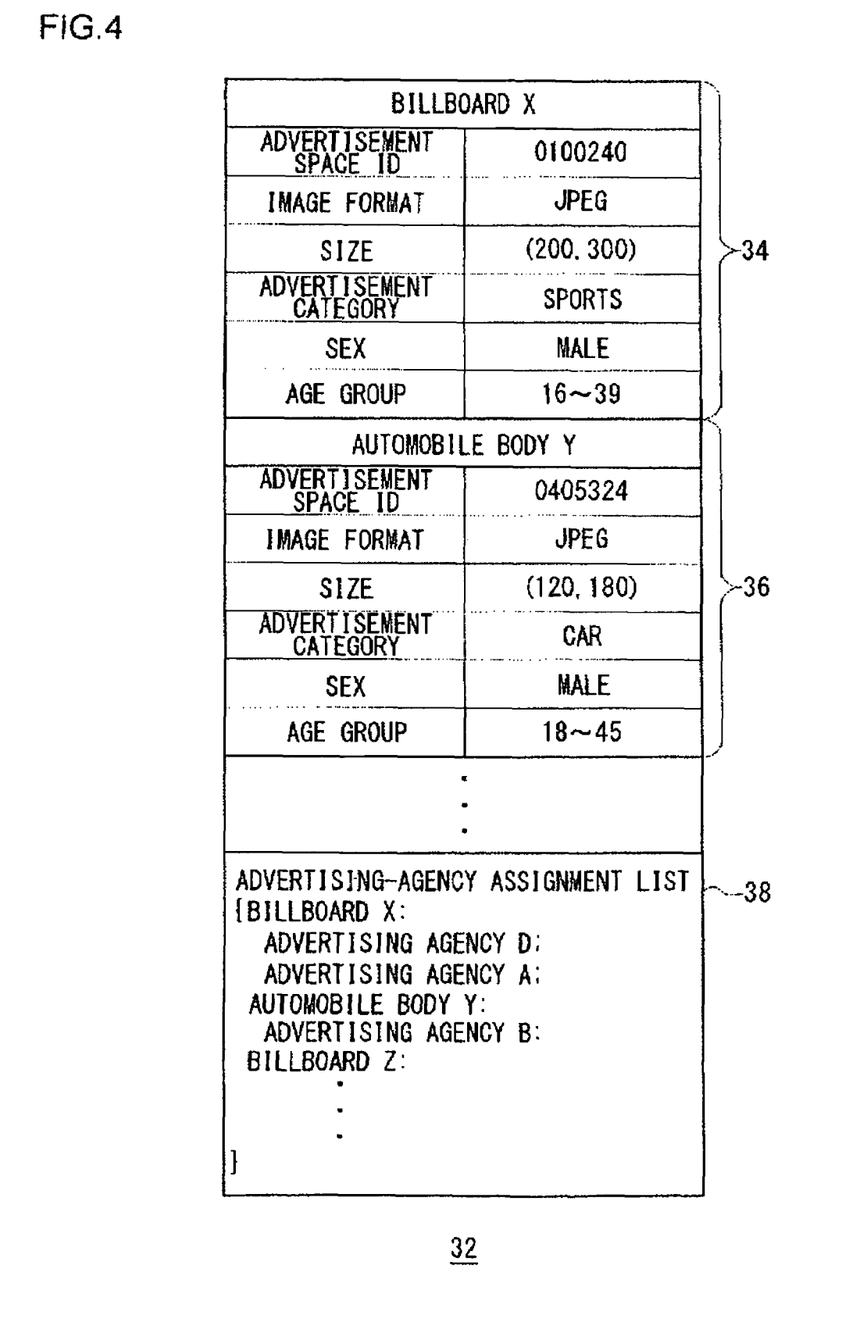
FIG. 4 is a diagram that illustrates the data structure of an advertisement-space definition file shown in FIG. 2.

FIG. 4 is a diagram that illustrates the data structure of an advertisement-space definition file 32. The advertisement-space definition file 32 includes: advertisement-space information (numerals 34 and 36) that defines the properties of an advertisement space, object by object, using an object on which an advertisement is posted in a game space; and an advertising-agency assignment list 38 where the assignment of an advertising agency to each advertisement space is described. The properties of an advertisement space include an advertisement space ID, the format of an advertisement image, the size of the advertisement space, the category of an advertisement, the sex of the target audience for the advertisement, the age group of the target for the advertisement, etc.

In the example of the figure, a billboard X (numeral 34) and an automobile body Y (numeral 36) are defined as advertisement spaces. The format of the advertisement image to be posted on the billboard X is JPEG, the size is (200×300) (in pixels), the category of the advertisement is sports, the sex of the target audience for the advertisement is male, and the age group is from 16 to 39 years old. The format of the advertisement image to be posted on the automobile body Y is JPEG, the size is (120, 180), the category of the advertisement is a car, the sex of the target audience for the advertisement is male, and the age group is from 18 to 45 years old.

The advertising agencies D and A are assigned to the billboard X, and only the advertising agency B is assigned to the automobile body Y in the advertising-agency assignment list 38. When multiple advertising agencies are assigned to an advertisement space, the order of priority can be set for these advertising agencies. In the figure, the advertising agencies are listed in accordance with the order of priority, and priority is given to advertising agencies D and A in said order for the billboard X.

The advertising-agency assignment list 38 may be a program that writes which advertising agency is to be assigned, depending on the success or failure of a conditional expression by using a script language. For example, it may be a program that changes the assignment to the advertising agency B when the contract term for the advertising agency D is over or a program that changes the advertising agencies D and B into each other, depending on the time period and the day of the week for the display of the contents, the sex and the age of the user, etc.

In reference to the advertising-agency license list 22 stored in the advertisement-information memory unit 114, the assignment changing unit 116 cancels the assignment of an advertising agency, whose license has expired, to an advertisement space even when the advertising agency is assigned to any of the advertising spaces in the advertisement-space definition file 32. In addition to the expiration of the contract term, the expiration of a license includes the setting of a deny flag described in FIG. 3.

Taking the example of FIG. 4, two advertising agencies, the advertising agencies D and A, are assigned to the billboard X, and the advertising agency D has higher priority than the advertising agency A. Referring to FIG. 3, since a deny flag is set for the advertising agency D, the assignment changing unit 116 invalidates the advertising agency D. In contrast, the advertising agency A, which is assigned to the billboard X, with lower priority is valid as long as the contract term has not yet expired, since no deny flag is set. The assignment changing unit 116 compares the current time with the expiration time of the contract term, and it leaves the advertising agency A in its normal state if the contract term has not yet expired or invalidates the advertising agency A if the contract term is over. In this example, it is assumed that the contract term of the advertising agency A has not expired.

One advertising agency B is assigned to the automobile body Y. However, since a deny flag is set for the advertising agency B, the assignment changing unit 116 invalidates the advertising agency B. As a result, the automobile body Y does not have any valid advertising agency assigned to it.

Figure 5:
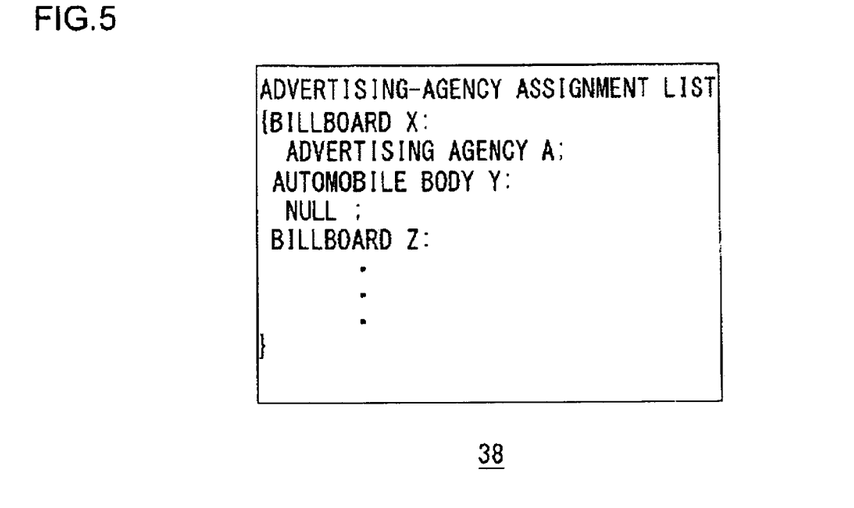
FIG. 5 is a diagram that shows an advertising-agency assignment list updated by an assignment changing unit shown in FIG. 2.

FIG. 5 shows the advertising-agency assignment list 38 updated by the assignment changing unit 116. As described, by the function of the assignment changing unit 116, only the advertising agency A that has lower priority is assigned to the billboard X, and the automobile body Y is marked as "NULL" showing that no advertising agency is assigned to it.

FIG. 2 is referred back again. In reference to the advertisement-space definition file 32 that is properly updated by the assignment changing unit 116, the advertisement downloading unit 118 downloads the advertisement data to be inserted in each advertisement space from the advertising-agency server 50 of the advertising agency validly assigned to the advertisement space. The advertisement downloading unit 118 stores the downloaded advertisement image 52 in the texture memory unit 132 of the rendering engine 130.

If no advertising agency is validly assigned to an advertisement space in the advertisement-space definition file 32, a default image 54 that is stored in advance in the texture memory unit 132 is used instead since the advertisement downloading unit 118 cannot download an advertisement.

In order to reflect both the current status of a license granted to an advertising agency by a platform provider and the latest business relationship between a content maker and an advertising agency, the advertisement-management processing block 110 operates every time a user runs the game contents. The advertisement-information reception unit 112 both receives the latest advertising-agency license list 22 and the advertisement-space definition file 32 and updates the details stored in the advertisement-information memory unit 114, and the assignment changing unit 116 cancels the assignment of an advertising agency, whose license has expired, to the advertisement space. When a new advertising agency is assigned to the advertisement space, the advertisement downloading unit 118 downloads an advertisement image from the new advertising agency and then replaces an old advertisement image stored in the texture memory unit 132 with the new advertisement image.

A detailed description will now be made of the configuration and the operation of the rendering engine 130. The rendering processing unit 136 retrieves polygon data of a three-dimensional object from a three-dimensional-object memory unit 138 and obtains the color value of the pixels by performing a rasterizing process and a shading process. In mapping a texture on the surface of an object, the rendering processing unit 136 computes the final color value of the pixels by using the color value of the texture mapped to the pixels by the texture-mapping unit 134 and writes the pixel data in a frame buffer 140.

In mapping an advertisement on the surface of an object that will undergo a rendering computation process by the rendering processing unit 136, the texture-mapping unit 134 retrieves the advertisement image 52 from the texture memory unit 132 and then performs texture mapping. In the absence of the advertisement image 52 to be mapped, the texture-mapping unit 134 performs texture mapping on the default image 54 instead, which is prepared in advance.

Figure 6:
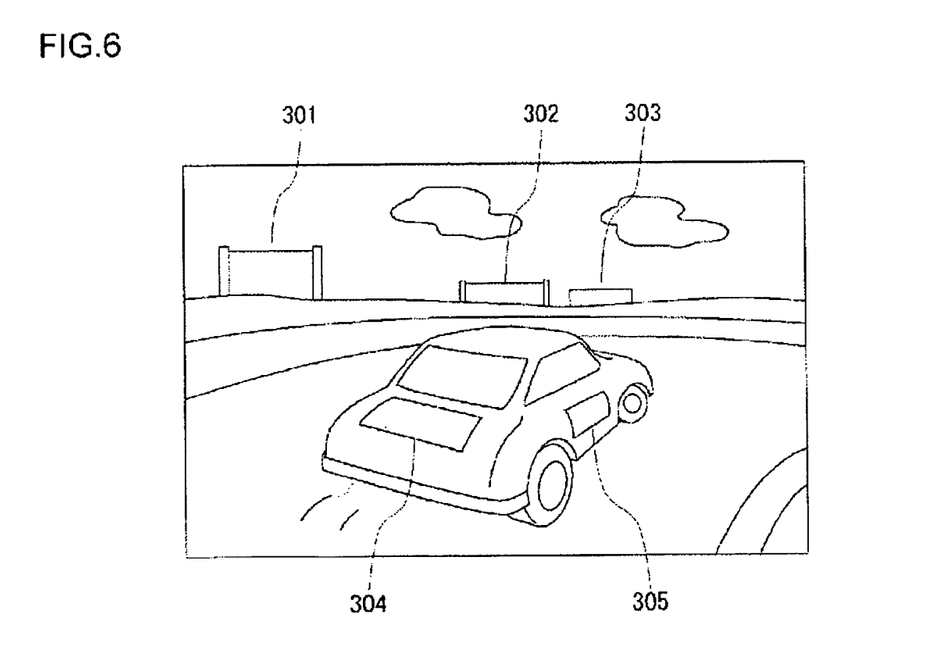
FIG. 6 is a diagram that shows an example of mapping an advertisement image onto an object in a game space.

FIG. 6 is a diagram that shows an example of mapping an advertisement image onto an object in a game space. There are billboards 301-303 outside the race course and a car running on the race course in a car racing game. In accordance with the definition of the advertisement-space definition file 32, advertisement images are first mapped onto both the billboards 301-303 and the parts of the automobile body (represented by numerals 304 and 305) and then displayed.

Figure 7:
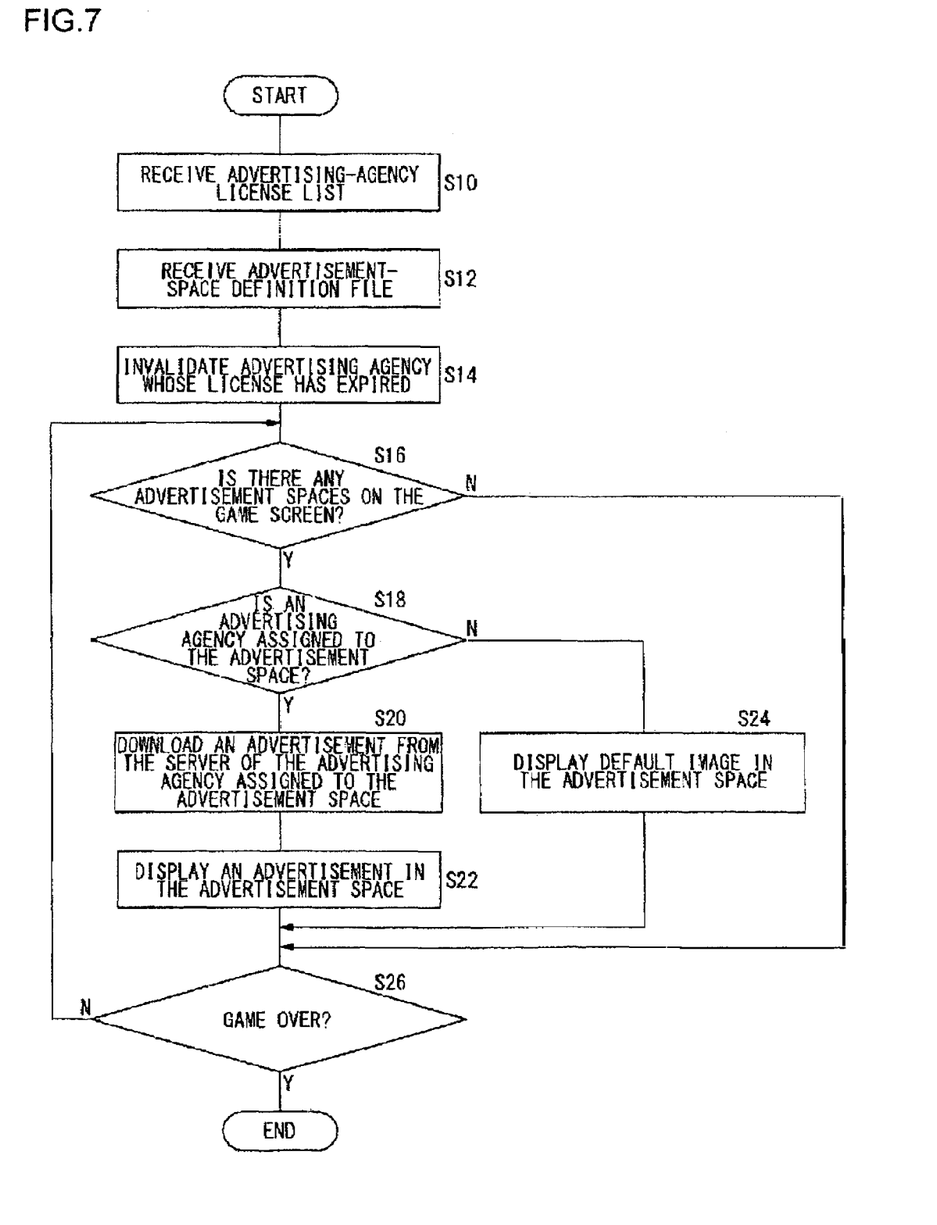
FIG. 7 is a flowchart that illustrates the procedure of an advertisement-displaying process performed by the content display processing apparatus.

FIG. 7 is a flowchart that illustrates the procedure of an advertisement-displaying process performed by the content display processing apparatus 100. The advertisement-information reception unit 112 receives the advertising-agency license list 22 from the license-management server 20 and then stores it in the advertisement-information memory unit 114 (S10) and likewise receives the advertisement-space definition file 32 from the content-management server 30 and then stores it in the advertisement-information memory unit 114 (S12).

The advertisement-information reception unit 112 updates both the advertising-agency license list 22 and the advertisement-space definition file 32 stored in the advertisement-information memory unit 114, for example, at the start of the game program. A configuration may be employed where the license-management server 20 or the content-management server 30 transmits the updated advertising-agency license list 22 or the advertisement-space definition file 32 to the content display processing apparatus 100.

The assignment changing unit 116 specifies an advertising agency whose license has expired by referring to the license list 22 to find whether the contract term has expired or whether the execution of the contract has been refused. Among the advertising agencies to which advertising spaces are assigned within the advertisement-space definition file 32, an advertising agency whose license has expired is deleted by the assignment changing unit 116 (S14). In general, multiple advertising agencies are prioritized and assigned to an advertisement space; thus, even when an advertising agency whose license has expired is deleted, another advertising agency whose license is still valid can be assigned to the advertisement space.

If there is an advertisement space on the game screen (Y in S16) and an advertising agency is assigned to the advertisement space (Y in S18), the advertisement downloading unit 118 downloads an advertisement image from the advertising-agency server 50 of the advertising agency assigned to the advertisement space (S20). The rendering engine 130 displays an advertisement in the advertisement space by performing texture mapping (S22). If there is no advertising agency assigned to the advertisement space (N in S18), the rendering engine 130 maps a default image to the advertisement space and displays it in the space (S24). The default image is, for example, an advertisement for a game device maker or a content creator.

If there is no advertisement space on the game screen (N in S16), the game progresses without displaying any advertisement. The processes of S16-S24 are repeated until the game is over (N in S26).

In the above procedure, the rendering engine 130 and the advertisement-management processing block 110 operate in synchronization with each other, and the rendering engine 130 downloads an advertisement to be inserted to an advertisement space when performing a rendering process for a game screen having an advertisement space. However, the rendering engine 130 and the advertisement-management processing block 110 may operate asynchronously of one another. For example, the advertisement-management processing block 110 may download advertisements prior to the start of the game and store them in the texture memory unit 132 for all the advertisement spaces that can possibly be displayed on a game screen. Alternatively, an advertisement may be downloaded in advance for an advertisement space that will appear on a game screen in the near future by anticipating the progress of the game.

As described above, according to the embodiment, an advertisement space can be provided in the contents, and an advertising agency can be assigned to the advertisement space. A content creator can change the advertising agency anytime by changing the advertisement-space definition file even after the contents are distributed. The latest business relationship between a content creator and an advertising agency can be reflected in the already distributed contents, making it easier for content business to be developed.

A game device does not display an advertisement from an advertising agency in an advertisement space as defined in an advertisement-space definition file, but it refers to an advertising-agency license list and cancels the assignment of an advertising agency, whose contract has expired, to the advertisement space. Upon the expiration of the contract with an advertising agency, a platform provider can prevent the display on a game device of the advertisement from the advertising agency whose contract has expired by updating an advertising-agency license list.

Described above is an explanation based on the embodiments of the present invention. These embodiments are intended to be illustrative only and it will be obvious to those skilled in the art that various modifications to constituting elements and processes could be developed and that such modifications are also within the scope of the present invention. Such an exemplary variation is described in detail.

In the above embodiment, the example is explained where an advertisement space is provided in a game space. However, the configuration may be provided where an advertisement is inserted onto not only a screen during game play but also a screen displayed during the downloading of the game or a screen displayed during the saving of data related to a game. Also, an advertisement may be displayed on the screen of a game device before the execution of a game or after game play. The contents are not particularly limited to a game. For example, contents may be a movie, etc. In this case, an advertisement may be displayed in a part of an area of the movie scene. The configuration may also be employed where contents are placed in a virtual space and then displayed, where an interface where a user can view the contents while exploring the virtual space is provided, and where an advertisement is displayed on billboards, etc., that are provided in the virtual space.

In the embodiment, multiple advertiser terminals 60 are connected to the advertising-agency server 50; however, another embodiment includes an advertiser itself playing a role of an advertising agency to be an advertisement distributor. Also, the embodiment is explained where a platform provider operates the license-management server 20 and a content creator operates the content-management server 30; however, it is also possible for a platform provider to operate the content-management server 30 and for a content creator to operate the license-management server 20.

INDUSTRIAL APPLICABILITY

The present invention can be applied to a technique for displaying an advertisement in the contents.

The invention claimed is:

1. A content display processing apparatus comprising a hardware processor for managing:

an advertisement-information reception unit configured to receive and store in a memory:
  an advertisement-space definition file, received from a content management server, the advertisement-space definition file defining each of a plurality of advertisement spaces into which one or more advertisements are to be inserted when content is displayed, and, for each for each advertisement space, one or more advertisement agencies are assigned from which advertisements are delivered; and
  a license list, received from a license management server, the license list containing information related to the licensing validity of the one or more advertising agencies defined by the advertisement-space definition file, including, for each advertising agency, a license contract term and a deny flag to be set when the license for a respective advertising agency is not accepted;

an advertisement downloading unit configured to download from an advertisement agency server, in reference to the advertisement-space definition file stored in the memory, advertisement data to be inserted in each of the advertisement spaces provided by a respective advertising agency assigned to the advertisement space;

an assignment changing unit configured during the real-time display of an advertisement space to: determine an advertisement agency assigned for the advertisement space, with reference to the advertisement-space definition file; and evaluate, with reference to the license list, whether or not the assigned advertisement agency has an expired license or has been set with a deny flag, wherein, if the assigned advertisement agency has an expired license or has been set with a deny flag, as indicated by the license list, the assignment changing unit is configured to cancel an assignment of the assigned advertisement agency, to invalidate the assignment of the advertising agency to the advertisement space, and to update the advertisement-space definition file for the advertisement space; and a display processing unit configured to insert, during real-time display of the content on a user's display screen, advertisement data downloaded from the advertisement agency server of a respective advertisement agency assigned in the advertisement-space definition file and to display accordingly.

2. The content display processing apparatus according to claim 1 wherein the advertisement-information reception unit receives the latest advertisement-space definition file every time a user views content and updates the details of the advertisement-space definition file stored in the memory.

3. The content display processing apparatus according to claim 1 wherein the display processing unit inserts, when no advertising agency having a valid license is assigned to an advertisement space as a result of the assignment changing unit invalidating an advertising agency whose license has expired for the advertisement space, a default image in the advertisement space and displays accordingly.

4. A tangible, non-transitory computer readable storage medium recorded with a computer program product for execution by a processor, comprising:

an advertisement-information reception module that receives:
   an advertisement-space definition file, received from a content management server, the advertisement-space definition file defining each of a plurality of advertisement spaces into which one or more advertisements are to be inserted when content is displayed, and, for each for each advertisement space, one or more advertisement agencies are assigned from which advertisements are delivered; and
   a license list, received from a license management server, the license list containing information related to the licensing validity of the one or more advertising agencies defined by the advertisement-space definition file, including, for each advertising agency, a license contract term and a deny flag to be set when the license for a respective advertising agency is not accepted;

an advertisement downloading module that downloads from an advertisement agency server, in reference to the advertisement-space definition file, advertisement data to be inserted in each of the advertisement spaces provided by a respective advertising agency validly assigned to the advertisement space during real-time display of the content on a user's display screen;

an assignment changing module that, during the real-time display of an advertisement space: determines an advertisement agency assigned for the advertisement space, with reference to the advertisement-space definition file; and evaluates, with reference to the license list, whether or not the assigned advertisement agency has an expired license or has been set with a deny flag, wherein, if the assigned advertisement agency has an expired license or has been set with a deny flag, as indicated by the license list, the assignment changing module cancels an assignment of the assigned advertisement agency, invalidates the assignment of the advertising agency to the advertisement space, and updates the advertisement-space definition file for the advertisement space; and a display processing module that, during real-time display of the content on a user's display screen, inserts advertisement data downloaded from the advertisement agency server of a respective advertisement agency assigned in the advertisement-space definition file and to display accordingly.

5. A method of displaying an advertisement in content, comprising:

receiving an advertisement-space definition file from a server, the advertisement-space definition file defining each of a plurality of advertisement spaces into which one or more advertisements are to be inserted when content is displayed, and, for each for each advertisement space, one or more advertisement agencies are assigned from which advertisements are delivered, and receiving a license list from a server, the license list containing information related to the licensing validity of the one or more advertising agencies defined by the advertisement-space definition file, including, for each advertising agency, a license contract term and a deny flag to be set when the license for a respective advertising agency is not accepted;

downloading, from an advertisement agency server, in reference to the advertisement-space definition file, advertisement data to be inserted in each of the advertisement spaces provided by a respective advertising agency validly assigned to the advertisement space;

determining, by one or more processors, during the real-time display of an advertisement space, an advertisement agency assigned for the advertisement space, with reference to the advertisement-space definition file;

evaluating, by the one or more processors, with reference to the license list, whether or not the assigned advertisement agency has an expired license or has been set with a deny flag, and, if the assigned advertisement agency has an expired license or has been set with a deny flag as indicated by the license list, cancelling an assignment of the assigned advertisement agency, invalidating the assignment of the advertising agency to the advertisement space, and updating the advertisement-space definition file for the advertisement space; and inserting, during real-time display of the content on a user's display screen, advertisement data downloaded from the advertisement agency server of a respective advertisement agency assigned in the advertisement-space definition file.

* * * * *